United States Patent
Duan et al.

(10) Patent No.: US 12,136,887 B2
(45) Date of Patent: Nov. 5, 2024

(54) MULTI-ACTIVE BRIDGE (MAB) CONVERTER AND CONTROL METHOD THEREOF AND POWER CONVERSION DEVICE

(71) Applicant: Eaton Intelligent Power Limited, Dublin (IE)

(72) Inventors: Jiajie Duan, Shanghai (CN); Jianxiong Yu, Shanghai (CN); Qiang Chen, Shanghai (CN); Han Li, Shanghai (CN); Cheng Luo, Shanghai (CN); Dongsheng Li, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 182 days.

(21) Appl. No.: 17/930,949

(22) Filed: Sep. 9, 2022

(65) Prior Publication Data
US 2023/0081157 A1 Mar. 16, 2023

(30) Foreign Application Priority Data
Sep. 10, 2021 (CN) .......................... 202111060968.X

(51) Int. Cl.
*H02M 3/335* (2006.01)
*H02M 1/12* (2006.01)

(52) U.S. Cl.
CPC ......... *H02M 3/33576* (2013.01); *H02M 1/12* (2013.01); *H02M 3/33573* (2021.05)

(58) Field of Classification Search
CPC ............. H02M 3/285; H02M 3/33576; H02M 3/33573
See application file for complete search history.

(56) References Cited

U.S. PATENT DOCUMENTS 10,742,128 B2 * 8/2020 Higaki ............... H02M 3/1586

FOREIGN PATENT DOCUMENTS

| CN | 103178742 A | * | 6/2013 | |
|----|-------------|---|--------|---|
| CN | 109617426 A | * | 4/2019 | .......... H02M 5/4585 |
| CN | 111628490 A | * | 9/2020 | ................ H02J 1/10 |

* cited by examiner

Primary Examiner — Gary A Nash
(74) Attorney, Agent, or Firm — Stanek Lemon Crouse & Meeks, PA

(57) ABSTRACT

The present invention provides a multi-active bridge converter. The converter comprises n multi-active bridges, wherein each of the n multi-active bridges comprises a DC/AC bridge, a single-phase transformer and m AC/DC bridges, where n is greater than or equal to 3, and m is greater than or equal to 1; the single-phase transformer is provided with one primary winding and m secondary windings; the DC/AC bridge is configured to receive a DC input signal, and AC output terminals of the DC/AC bridge are connected to the primary winding of the single-phase transformer; one terminal of the $i^{th}$ secondary winding among the m secondary windings of the single-phase transformer is connected to an AC input terminal of the $i^{th}$ AC/DC bridge among the m AC/DC bridges, the other terminal of the $i^{th}$ secondary winding is connected to the other terminals of the $i^{th}$ secondary windings among m secondary windings of single-phase transformers in the remaining (n−1) multi-active bridges, where i is greater than or equal to 1 and less than or equal to m; and positive busbars DC+ and negative busbars DC− of the DC output terminals of all the AC/DC bridges among the n multi-active bridges are respectively connected with each other to serve as DC output terminals of the multi-active bridge converter.

13 Claims, 13 Drawing Sheets

DAB

MAB

MULTI-ACTIVE BRIDGE (MAB) CONVERTER AND CONTROL METHOD THEREOF AND POWER CONVERSION DEVICE

CROSS-REFERENCE TO RELATED APPLICATIONS

The present application claims priority to Chinese Patent Application No. 202111060968.X filed on Sep. 10, 2021, entitled MULTI-ACTIVE BRIDGE (MAB) CONVERTER AND CONTROL METHOD THEREOF AND POWER CONVERSION DEVICE, the disclosure of which is incorporated herein by reference in its entirety.

TECHNICAL FIELD

The present invention belongs to the field of electric power sources, and more particularly relates to a multi-active bridge converter, a control method therefor, and a power conversion device including the multi-active bridge converter.

BACKGROUND

In hyper-scale power supply applications, a high-voltage (HV) or medium-voltage (MV) power conversion device can achieve higher power density, higher efficiency, and lower weight because a smaller high-frequency transformer (working at a frequency higher than 10 kHz) is used instead of the conventional bulky 50/60 Hz transformer.

Referring to a circuit topology of a cascaded bridge based medium-voltage converter in the prior art shown in FIG. 1, the medium-voltage converter has a medium-voltage AC input and a low-voltage DC output. A low-voltage DC side of the medium-voltage converter may be directly used as a low-voltage DC output, or may also be connected to a DC/DC or DC/AC circuit for DC or AC output. The medium-voltage converter includes a rectifier section including n (n≥2) cascaded (serially connected) rectifiers (AC/DC converters) and a DC/DC converter section including dual isolated DC/DC circuits respectively connected to output terminals of each rectifier. An exemplary representation of the dual isolated DC/DC circuit is a dual-active bridge (DAB) including a primary bridge and a secondary bridge which are isolated by a transformer. The output terminals of all dual isolated DC/DC circuits are connected in parallel with each other to form the low-voltage DC output. That is, a medium-voltage AC input is connected with n (n≥2) cascaded (serially connected) rectifiers (AC/DC converters), and each of the rectifiers is converted by a corresponding one of a plurality of dual-active bridges with the output terminals being connected in parallel with each other. A rectifier and a dual-active bridge are combined to form a power unit. Input terminals of all power units are connected in series with each other; and output terminals of all power units are connected in parallel with each other.

In practice, however, for the high-frequency transformer, core/winding loss caused by the applied high-frequency voltage will significantly limit the frequency and capacity, and thus limit the industrial application of the high-frequency transformer.

From the perspective of winding loss, higher order harmonics (such as $3^{rd}$, $5^{th}$, or $7^{th}$ harmonics) introduced by a square wave voltage generated by a power conversion device contribute more to the loss than a fundamental frequency voltage and current. For transformers operating at dozens of kHz, it becomes necessary to eliminate higher order harmonics of a transformer current.

SUMMARY

Therefore, an objective of the present invention is to overcome the above defects of the prior art and to provide a multi-active bridge converter comprising n multi-active bridges, wherein each of the n multi-active bridges comprises a DC/AC bridge, a single-phase transformer and m AC/DC bridges, where n is greater than or equal to 3, and m is greater than or equal to 1;

the single-phase transformer is provided with a primary winding and m secondary windings; the DC/AC bridge is configured to receive a DC input signal, and AC output terminals of the DC/AC bridge are connected to the primary winding of the single-phase transformer; one terminal of the $i^{th}$ secondary winding among the m secondary windings of the single-phase transformer is connected to an AC input terminal of the $i^{th}$ AC/DC bridge among the m AC/DC bridges, the other terminal of the $i^{th}$ secondary winding is connected to the other terminals of the $i^{th}$ secondary windings among m secondary windings of single-phase transformers in the remaining (n−1) multi-active bridges, where i is greater than or equal to 1 and less than or equal to m; and positive busbars DC+ and negative busbars DC− of the DC output terminals of all the AC/DC bridges in the n multi-active bridges are respectively connected with each other to serve as DC output terminals of the multi-active bridge converter.

Preferably, the DC/AC bridge includes a first capacitor and a second capacitor connected in series with each other, and a first switch and a second switch connected in series with each other, where a series circuit composed of the first capacitor and the second capacitor is connected in parallel to a series circuit composed of the first switch and the second switch so as to form a parallel circuit, both ends of the parallel circuit serve as the DC input terminals of the DC/AC bridge, and a node between the first capacitor and the second capacitor and a node between the first switch and the second switch serve as the AC output terminals of the DC/AC bridge.

Preferably, the DC/AC bridge includes an H bridge composed of first to fourth switches and a capacitor connected in parallel to input terminals of the H bridge, both terminals of the capacitor serve as DC input terminals of the DC/AC bridge, and a node between the first switch and the second switch and a node between the third switch and the fourth switch serve as the AC output terminals of the DC/AC bridge.

Preferably, the AC/DC bridge is a three-terminal bridge.

Preferably, the three-terminal bridge includes a first switch and a second switch connected in series with each other, and a capacitor connected in parallel with a series circuit composed of the first switch and the second switch, where a node between the first switch and the second switch serves as an AC input terminal of the three-terminal bridge, and both terminals of the capacitor serve as DC output terminals of the three-terminal bridge.

Preferably, the AC output terminals of the DC/AC bridge are connected to the primary winding of the single-phase transformer through a first inductor, and one terminal of the $i^{th}$ secondary winding among the m secondary windings of the single-phase transformer is connected to the AC input terminal of the $i^{th}$ AC/DC bridge among the m AC/DC bridges through a second inductor.

Preferably, n is equal to 3, and m is equal to 2.

Preferably, m is equal to 1.

Preferably, the single-phase transformer further includes 2k+2 secondary windings and k+1 AC/DC bridges, where k≥0, wherein first terminals of the $(2k+1)^{th}$ secondary windings among the 2k+2 secondary windings of single-phase transformers of the n multi-active bridges are connected to each other, second terminals of the $(2k+1)^{th}$ secondary windings are connected to first terminals of the $(2k+2)^{th}$ secondary windings among the 2k+2 secondary windings of the single-phase transformers of the adjacent multi-active bridges, and second terminals of the $(2k+2)^{th}$ secondary windings are connected to AC input terminals of corresponding $(k+1)^{th}$ AC/DC bridges.

Preferably, n is equal to 3.

Preferably, k is equal to 0.

Preferably, a turns-ratio of the first secondary winding to the second secondary winding to the third secondary winding of the single-phase transformer is 100:58:58.

In another aspect, the present invention further provides a power conversion device, comprising a rectifier section and the multi-active bridge converter according to the present invention, wherein the rectifier section comprises n cascaded rectifiers, and input terminals of any one of the n multi-active bridges of the multi-active bridge converter are connected to output terminals of a corresponding one of the n cascaded rectifiers.

In yet another aspect, the present invention provides a control method for the multi-active bridge converter of the present invention, wherein a phase angle at which waveforms of output voltages of the single-phase transformers in the n multi-active bridges are staggered with each other is controlled to be equal to a period of $n*j^{th}$ harmonics, where j is a positive integer.

Compared with the prior art, the present invention has the following advantages: specific harmonics of the transformer can be eliminated, thereby reducing the power loss of the transformer, reducing the number of semiconductors and saving the cost.

BRIEF DESCRIPTION OF DRAWINGS

The embodiments of the present invention will be further described below with reference to the accompanying drawings, in which.

DETAILED DESCRIPTION

In order to make the objectives, technical solutions and advantages of the present invention more clearly understood, the present invention will be further described in detail in conjunction with the accompanying drawings and specific embodiments. It should be understood that the specific embodiments described herein are only used to explain the present invention, but not to limit the present invention.

First Embodiment

Figure 1:
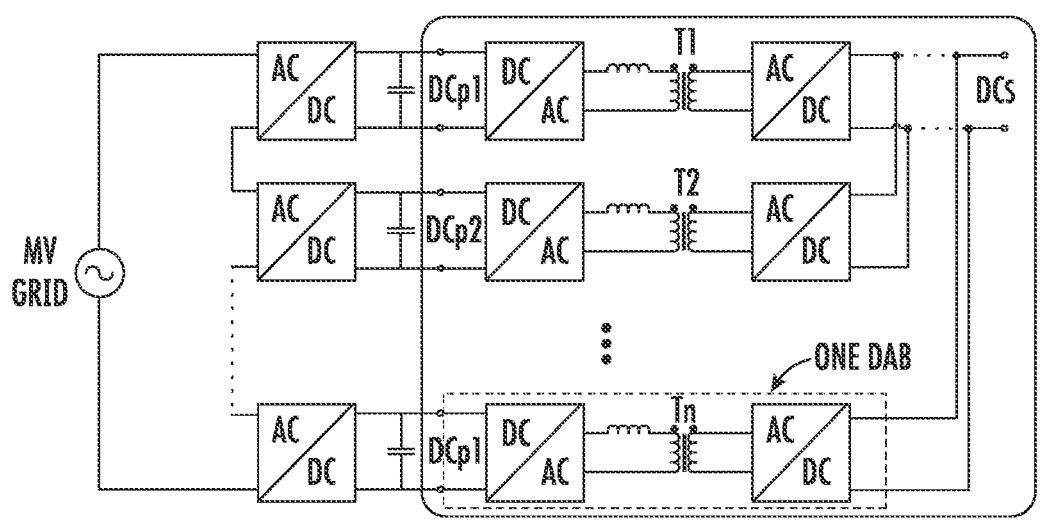
FIG. 1 shows a circuit topology of a cascaded bridge based medium-voltage converter in the prior art.
Figure 2:
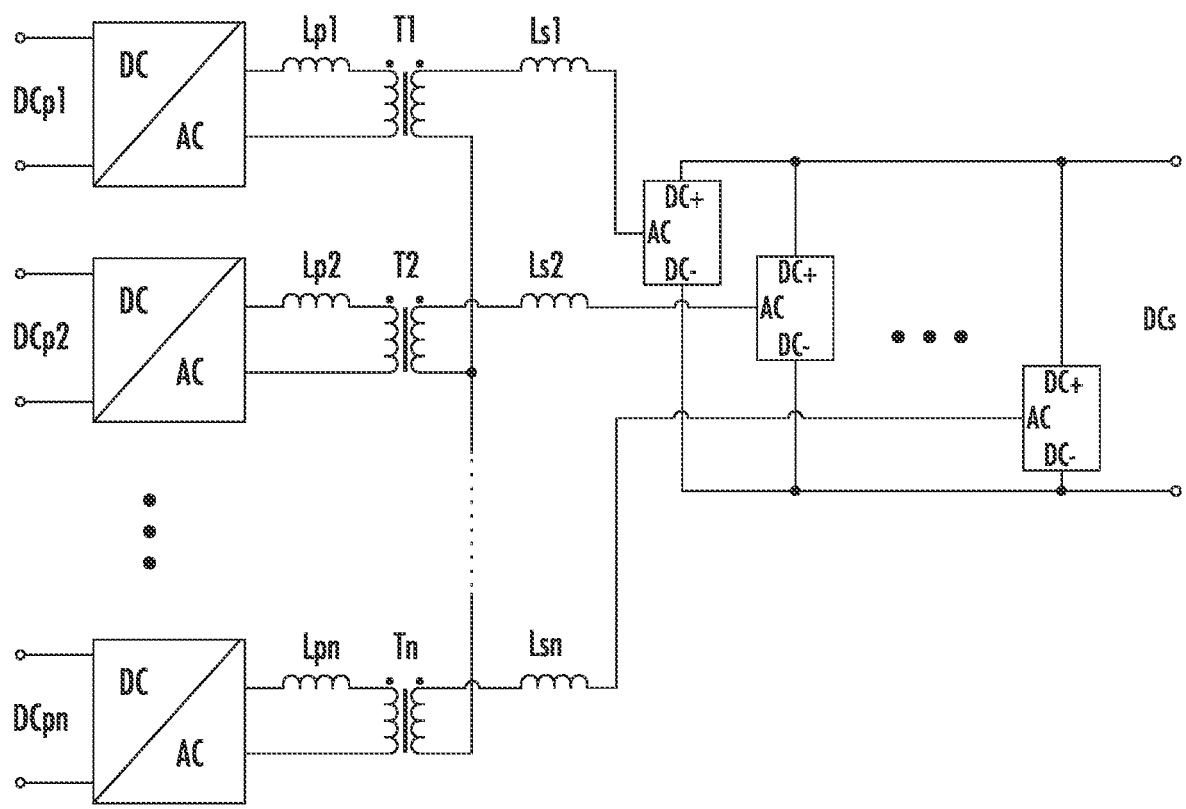
FIG. 2 shows a circuit topology of a DC/DC converter section of a power conversion device according to a first embodiment of the present invention.

This embodiment provides a power conversion device including a rectifier section and a DC/DC converter section. The rectifier section includes n cascaded (serially connected) rectifiers (AC/DC converters) as shown in FIG. 1. A circuit topology of the DC/DC converter section is shown in FIG. 2, in which n single-phase two-winding transformers T1 to Tn are adopted to isolate n DC/AC bridges from n AC/DC bridges respectively. In this embodiment, n is greater than or equal to 3. DC input terminals DCp1 to DCpn of the DC/AC bridges are respectively connected to output terminals of corresponding rectifiers, and n rectifiers are connected in series with each other and then to mains supply. An AC output terminal of any one of the DC/AC bridges is connected to a primary winding of a corresponding transformer. The first terminals of secondary windings of the transformers T1 to Tn are connected to each other, and the second terminals of the secondary windings are respectively connected to an AC input terminal of a corresponding AC/DC bridge. Positive busbars DC+ and negative busbars DC− of the DC output terminals of the n AC/DC bridges are respectively connected to each other, thereby forming DC output DCs. In this embodiment, AC/DC bridges are three-terminal bridges each comprising one AC input terminal and two DC output terminals (DC+ and DC−), where connections between the AC input terminal and the DC+ output terminal as well as between the AC input terminal and the DC− output terminal are alternatively powered on for generating a square wave voltage. By controlling powered-on states of the three-terminal bridges, phases of the square wave voltages generated by the transformers can be adjusted. When the three-terminal bridge is powered on, a potential at the input terminal is equal to a potential at the output terminal. In this case, a high-frequency AC loop is formed between the AC terminals of more than two three-terminal bridges. In addition, inductances Lp1 to Lpn between DC/AC bridges and primary sides of the transformers and inductances Ls1 to Lsn between the secondary sides of the transformers and AC/DC bridges shown in FIG. 2 may be separate inductances, or may represent leakage inductances of corresponding transformers. In the present invention, one unit of the DC/DC converter section is referred to as a multi-active bridge (MAB).

Figure 3A:
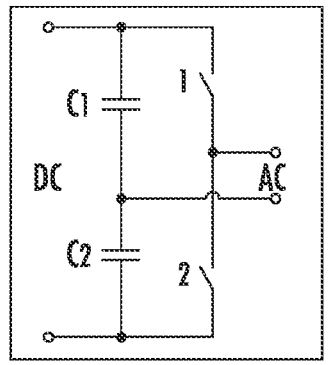
FIGS. 3a and 3b respectively show two exemplary and non-limitative circuit topologies of a DC/AC bridge of the present invention.
Figure 3B:
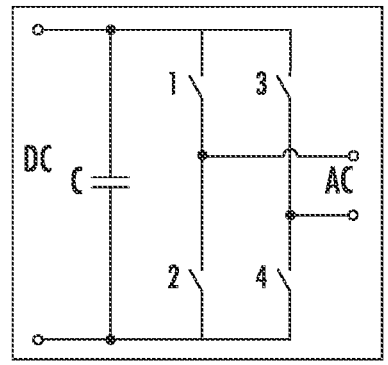

FIGS. 3a and 3b respectively show two exemplary and non-limitative circuit topologies of a DC/AC bridge of the present invention. As shown in FIG. 3a, a DC/AC bridge in a first example is an H bridge comprising a first capacitor $C_1$ and a second capacitor $C_2$ connected in series with each other, and a first switch 1 and a second switch 2 connected in series with each other, wherein, a series circuit composed of the first capacitor $C_1$ and the second capacitor $C_2$ is connected in parallel to a series circuit composed of the first switch 1 and the second switch 2 to form a parallel circuit with both ends thereof serving as input terminals of the DC/AC bridge, and a node between the first capacitor $C_1$ and the second capacitor $C_2$ and a node between the first switch 1 and the second switch 2 serve as the output terminals of the DC/AC bridge. As shown in FIG. 3b, the DC/AC bridge in a second example includes an H bridge composed of first to fourth switches 1-4 and a capacitor C connected in parallel to input terminals of the H bridge, both terminals of the capacitor C constitute input terminals of the DC/AC bridge, and a node between the first switch 1 and the second switch 2 and a node between the third switch 3 and the fourth switch 4 constitute output terminals of the DC/AC bridge.

Figure 4:
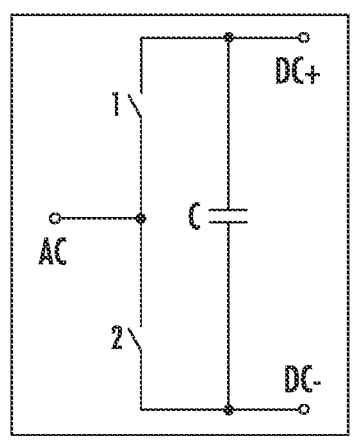
FIG. 4 shows an exemplary and non-limitative circuit topology of a three-terminal AC/DC bridge of the present invention.

FIG. 4 shows an exemplary and non-limitative circuit topology of the three-terminal AC/DC bridge of the present invention. The three-terminal AC/DC bridge includes a first switch 1 and a second switch 2 connected in series with each other and a capacitor C connected in parallel with a series circuit composed of the first switch 1 and the second switch 2, wherein, a node between the first and second switches 1 and 2 constitutes an AC input terminal of the three-terminal AC/DC bridge, and both terminals of the capacitor C constitute DC output terminals (DC+ and DC−) of the three-terminal AC/DC bridge.

Figure 5:
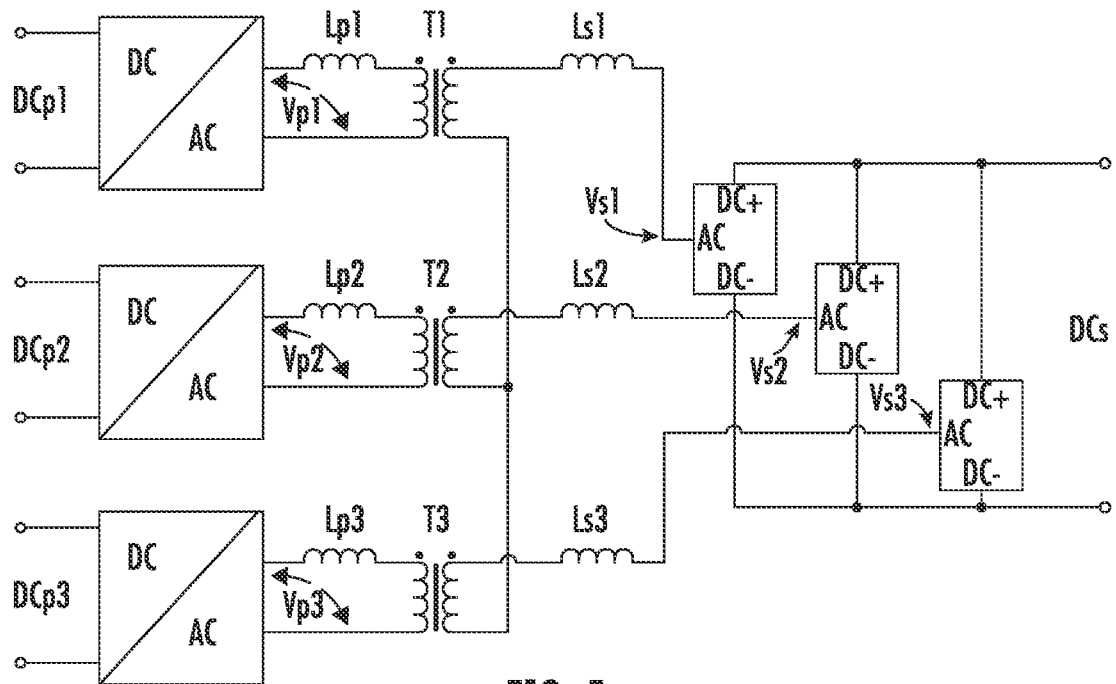
FIG. 5 shows a circuit topology of a DC/DC converter section containing 3 MABs according to the first embodiment of the present invention.
Figure 6:
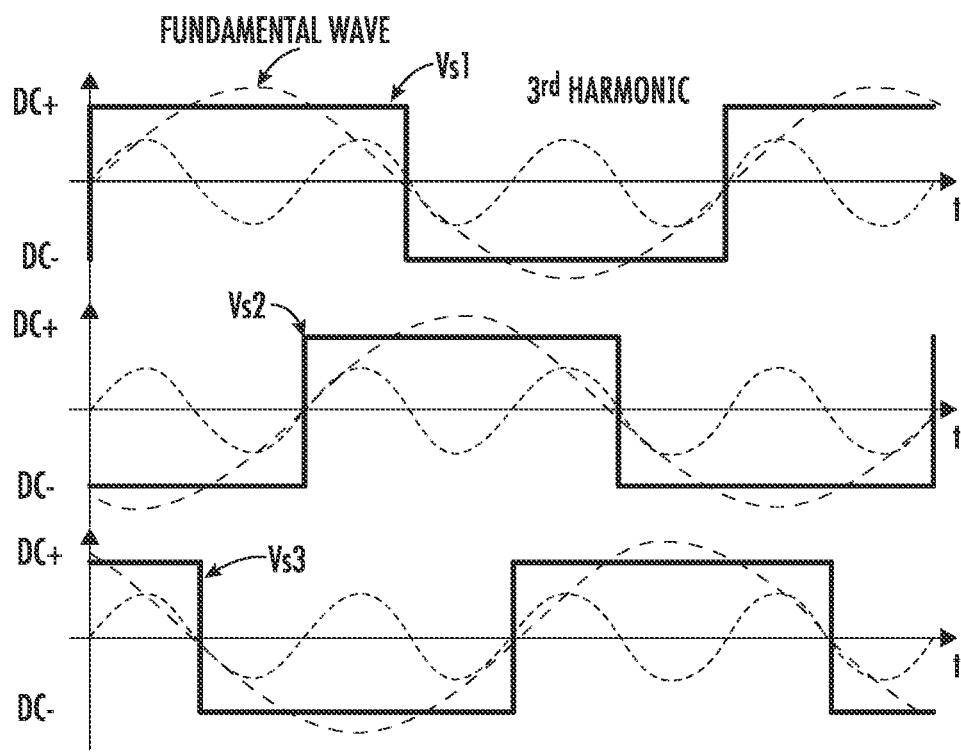
FIG. 6 shows a voltage waveform on a secondary side of a transformer in the circuit topology shown in FIG. 5.
Figure 7:
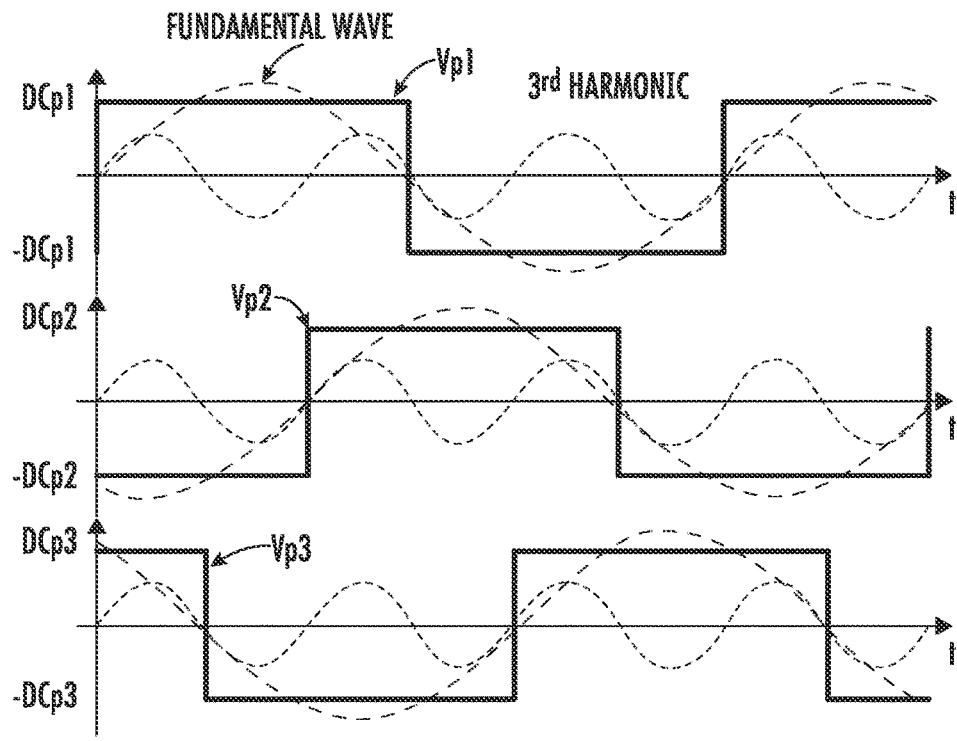
FIG. 7 shows a voltage waveform on a primary side of the transformer corresponding to FIG. 6.

In order to verify the effects of the present invention, the inventors simulate the voltages and currents of a DAB-based converter in the prior art and an MAB-based converter in the present invention respectively working at a switching frequency of 30 kHz based on a power electronic system simulation platform PLECS®. Taking a n=3 system as an example, referring to a circuit topology of a DC/DC converter section containing 3 MABs shown in FIG. 5, respective components are arranged in the same way as in FIG. 2, primary side voltages of the transformers T1, T2 and T3 are Vp1, Vp2 and Vp3 respectively, and secondary side voltages of the transformers T1, T2 and T3 are Vs1, Vs2 and Vs3 respectively. Referring to a voltage waveform on a secondary side of the transformer shown in FIG. 6, FIG. 6 shows a fundamental wave and a $3^{rd}$ harmonic contained in each square wave. When phase angles at which waveforms of Vs1, Vs2 and Vs3 are staggered mutually are exactly equal to a period of one $3^{rd}$ harmonic, in a three-phase system composed of the secondary windings of T1, T2 and T3, electromotive potentials of the $3^{rd}$ harmonics in Vs1, Vs2, and Vs3 are in the same phase. According to the Kirchhoff's law, no $3^{rd}$ harmonic current can be generated at a common node of the secondary windings of T1, T2 and T3, so the $3^{rd}$ harmonic current cannot flow through the secondary windings of T1, T2 and T3. Referring to the voltage waveform on the primary side of the transformer shown in FIG. 7 corresponding to FIG. 6, FIG. 7 also shows fundamental waves and a $3^{rd}$ harmonics contained in square waves. When the phase angles at which the waveforms of Vp1, Vp2 and Vp3 are staggered mutually are also exactly equal to the period of one $3^{rd}$ harmonic, the phase differences between Vp1 and Vs1, Vp2 and Vs2, and Vp3 and Vs3 are equal, and three transformers can transmit equal fundamental power. Meanwhile, due to the blocking of the $3^{rd}$ current harmonics on the secondary side of the transformer, the $3^{rd}$ current harmonics on the primary side of the transformer cannot exist either. In this way, there is no $3^{rd}$ current harmonic in the entire multi-active bridge system.

Figure 8:
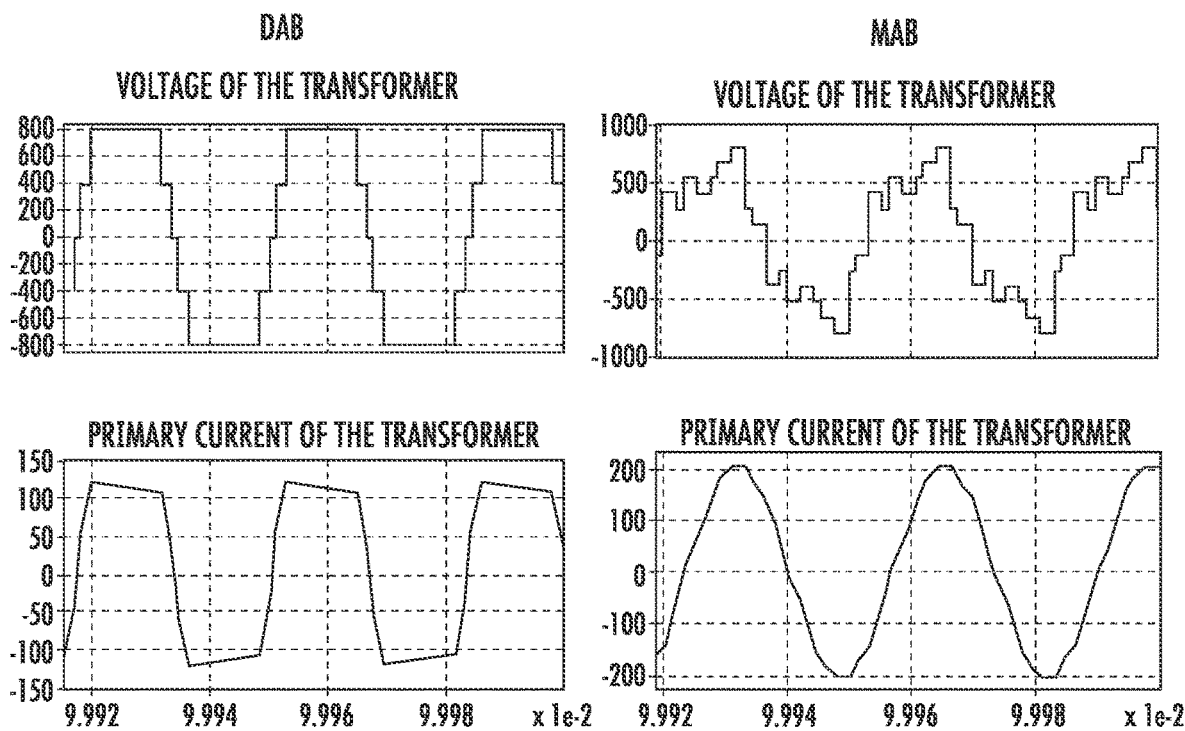
FIG. 8 shows simulation results of transformer voltage and current in the circuit topology shown in FIG. 5.

Referring to a simulation result of the n=3 system shown in FIG. 8, a phase shift between bridges of adjacent branches is 120°. The left side shows current and voltage waveforms of the DAB-based converter in the prior art, and the right side shows current and voltage waveforms of the MAB-based converter in the present invention. Due to the elimination of the $3^{rd}$ harmonics, a waveform of the primary current of the transformer in the present invention is more regular.

Figure 9:
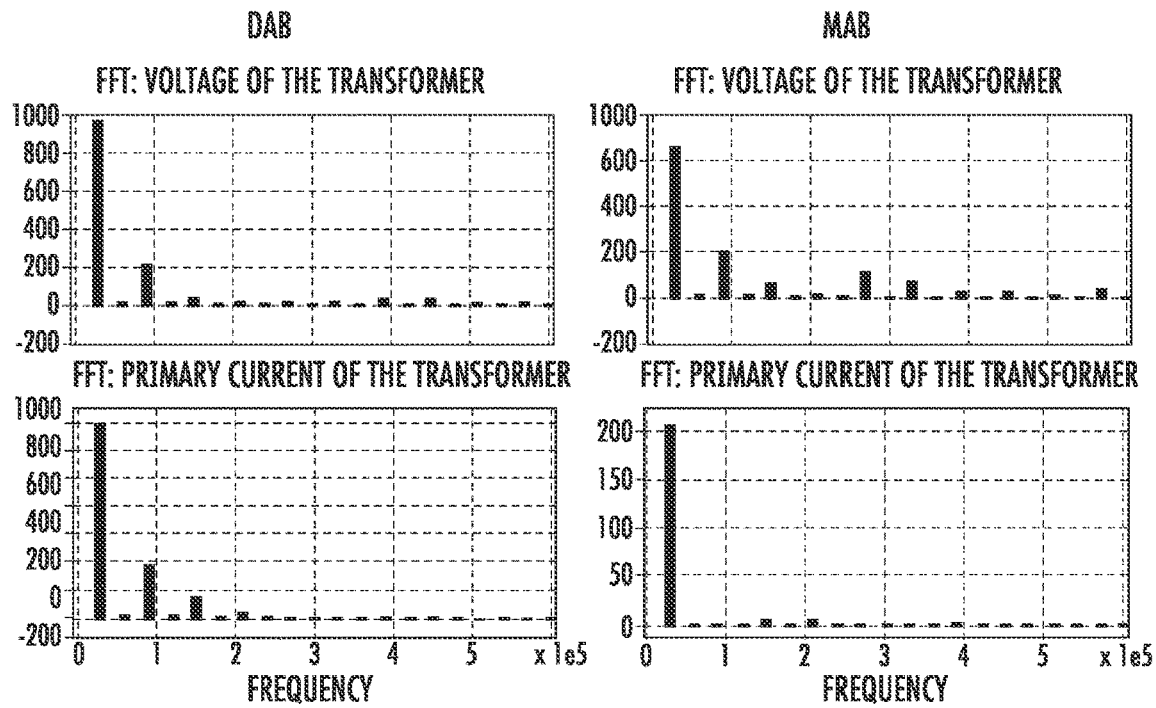
FIG. 9 shows a fast Fourier transform result of FIG. 8.

Fast Fourier transform (FFT) is performed on the current and voltage waveforms shown in FIG. 8 to obtain a current/voltage-frequency curve shown in FIG. 9. It is clear that, in the MAB-based converter of the present invention, $3^{rd}$, $6^{th}$, $9^{th}$ ... $3j^{th}$ (j is a positive integer) harmonics of the primary current of the transformer are significantly reduced, so that the loss of the transformer can be significantly reduced.

With the elimination of specific harmonics, the transformer of the present invention can operate at higher power and capacity, as well as higher efficiency and higher power density. In addition, since three-terminal bridges are adopted, the number of semiconductor devices in the present invention is also significantly reduced, thereby greatly saving the cost.

According to other embodiments of the present invention, in case of n=5, it is possible to control a phase angle at which the waveforms of Vs1, Vs2, Vs3, Vs4 and Vs5 are staggered mutually to be exactly equal to a period of one $5^{th}$ harmonic for eliminating $5^{th}$, $10^{th}$, $15^{th}$ ... $5j^{th}$ (j is a positive integer) harmonics of the output voltage of the transformer. In case of n=7, it is possible to control the phase angle at which the waveforms of Vs1, Vs2, Vs3, Vs4, Vs5, Vs6 and Vs7 are staggered mutually to be exactly equal to a period of one $7^{th}$ harmonic for eliminating $7^{th}$, $14^{th}$, $21^{th}$ ... $7j^{th}$ (j is a positive integer) harmonics of the output voltage of the transformer. In summary, the power conversion device of the present invention can eliminate $n*j^{th}$ (n is an odd number≥3, j is a positive integer) harmonics at the output terminal of the transformer. Those skilled in the art can understand that, in general cases, the lower the order of the higher harmonics, the greater the intensity, so the n=3 system is usually selected to eliminate the $3^{rd}$ harmonics.

Second Embodiment

Figure 10:
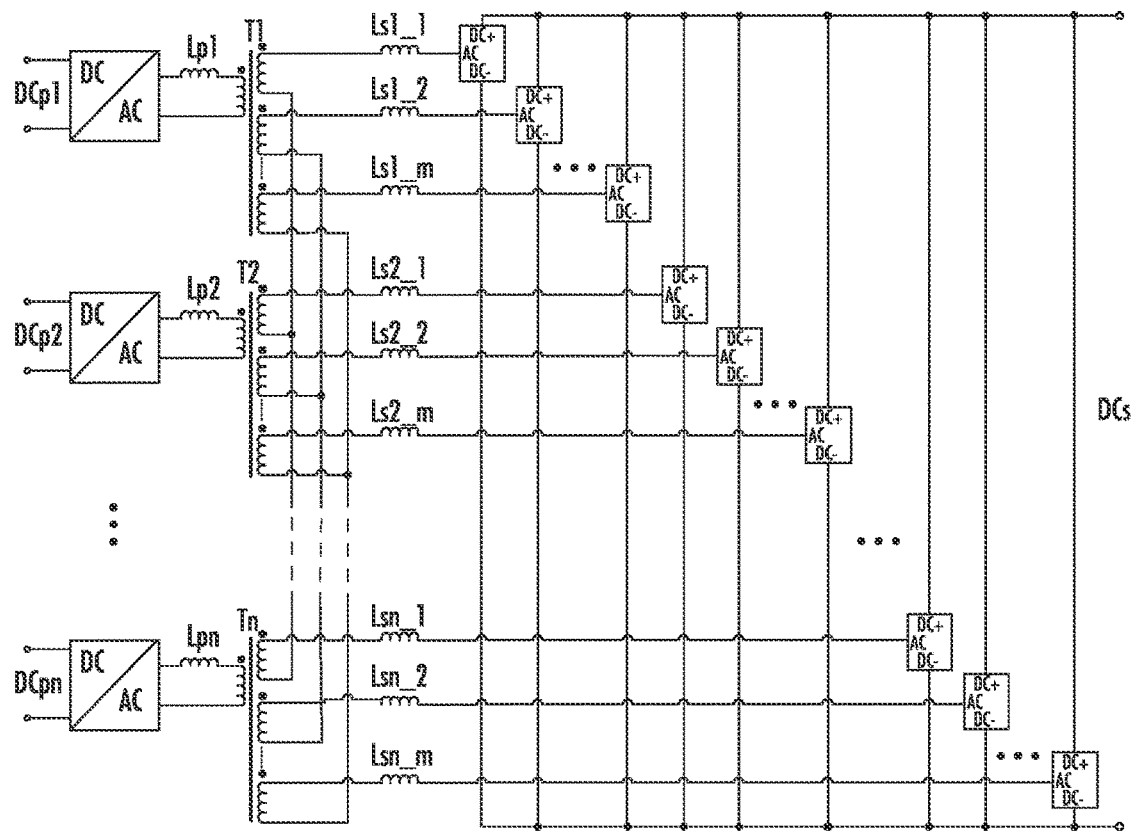
FIG. 10 is a circuit topology of a DC/DC converter section of a power conversion device according to a second embodiment of the present invention.

In the circuit topology shown in FIG. 2, a three-terminal bridge is used to reduce the number of semiconductor apparatuses, but it is necessary to improve the voltage withstand capability of the semiconductor apparatuses. In order to further solve this problem, a second embodiment is proposed. This second embodiment provides another power conversion device including a rectifier section and a DC/DC converter section. The rectifier section includes n (n≥3) cascaded (serially connected) rectifiers (AC/DC converters) as shown in FIG. 1. The circuit topology of the DC/DC converter section is shown in FIG. 10, in which n (n≥3) single-phase (m+1)-winding transformers (a single-phase transformer including one primary winding and m secondary windings, where m≥1) T1 to Tn are used to isolate n DC/AC bridges from (n×m) AC/DC bridges respectively. DC input terminals DCp1 to DCpn of the DC/AC bridges are respectively connected to output terminals of corresponding rectifiers, and n rectifiers are connected in series with each other and then to mains supply. AC output terminals of any one of the DC/AC bridges are connected to a primary winding of a corresponding transformer. The first terminals of $i^{th}$ (1≤i≤m) secondary windings of the transformers T1 to Tn are connected to each other, and the second terminals of the $i^{th}$ secondary windings are connected to AC input terminals of the corresponding $i^{th}$ AC/DC bridges. Positive busbars DC+ and negative busbars DC− of the DC output terminals of the n×m AC/DC bridges are respectively connected to each other, thereby forming DC output DCs. Similarly, in this embodiment, the AC/DC bridges are three-terminal bridges, each comprising one AC input terminal and two DC output terminals (DC+ and DC−), wherein connections between the AC input terminal and the DC+ output terminal as well as between the AC input terminal and the DC− output terminal are alternatively powered on for generating a square wave voltage. By controlling powered-on states of the three-terminal bridges, phases of the square wave voltages generated by the transformers can be adjusted. In addition, inductances Lp1 to Lpn between AC output terminals of the DC/AC bridges and the primary sides of the transformers and inductances Ls1_1 to Ls1_m ... Lsn_1 to Lsn_m between respective windings on the secondary sides of the transformers and the AC input terminals of the AC/DC bridges may be separate inductances, or may represent leakage inductances of corresponding transformers. Similarly, one unit of the DC/DC converter section is referred to as a multi-active bridge (MAB). It can be seen that in this embodiment, the m three-terminal bridges of each transformer jointly carry a secondary voltage of the transformer, so the voltage withstand capability required by the semiconductor apparatuses of each three-terminal bridge can be significantly reduced. In addition, in this embodiment, the circuit topology in which m=1 corresponds to the circuit topology in the first embodiment.

Figure 11:
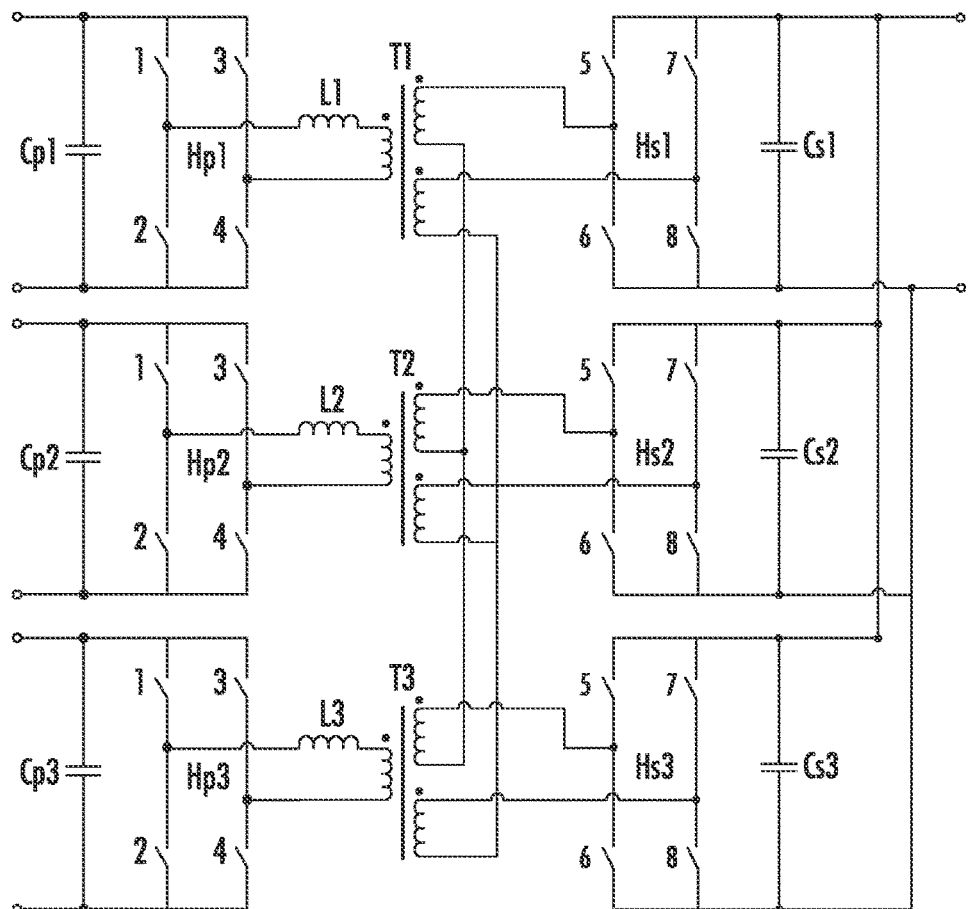
FIG. 11 is an example of the circuit topology of the DC/DC converter section according to the second embodiment of the present invention.

Referring to the example of the DC/DC converter section of this embodiment shown in FIG. 11, wherein, n is equal to 3, and m is equal to 2, the DC/AC bridge and the AC/DC bridge adopt the topologies shown in FIG. 3b and FIG. 4, respectively. In addition, two three-terminal AC/DC bridges connected to the output terminals of each transformer share one capacitor with switches 5-8 thereof constituting H-bridges Hs1-Hs3. The H-bridges in the DC/AC bridges are marked as Hp1-Hp3.

Similarly, the inventors simulate the voltages and currents of a DAB-based (n=3) converter in the prior art and an MAB-based converter in the present invention shown in FIG. 11 respectively working at a switching frequency of 30 kHz based on a power electronic system simulation platform PLECS®. Referring to a simulation result shown in FIG. 12, a phase shift between bridges of adjacent branches is 120°. The left side shows current and voltage waveforms of the DAB-based converter in the prior art, and the right side shows current and voltage waveforms of the MAB-based converter of the present invention. Similarly, due to the elimination of the $3^{rd}$ harmonics, a waveform of the primary current of the transformer of the present invention is more regular.

Figure 12:
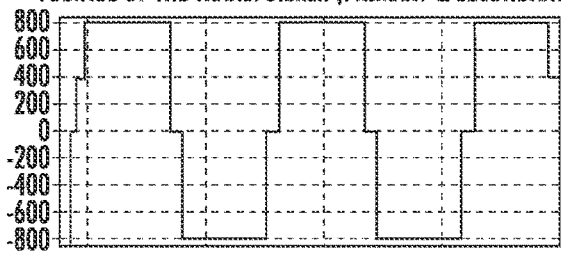
FIG. 12 shows simulation results of transformer voltage and current in the circuit topology shown in FIG. 11.
Figure 12:
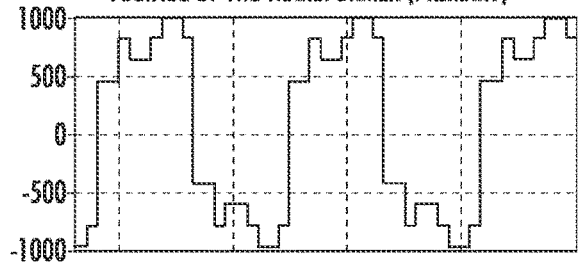
Figure 12:
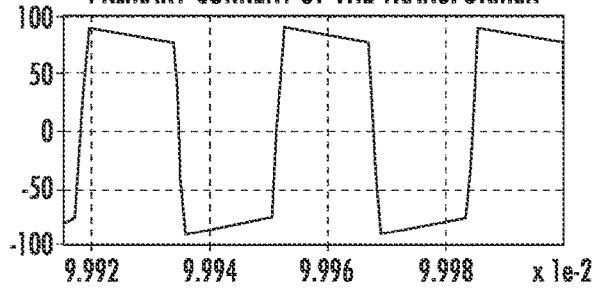
Figure 12:
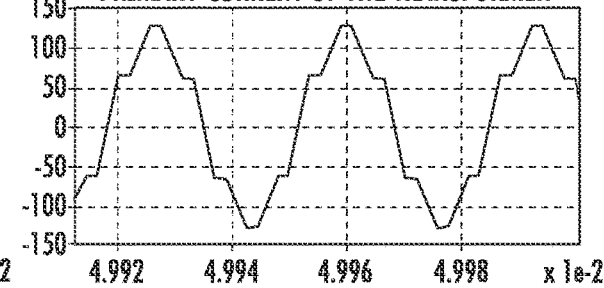
Figure 13:
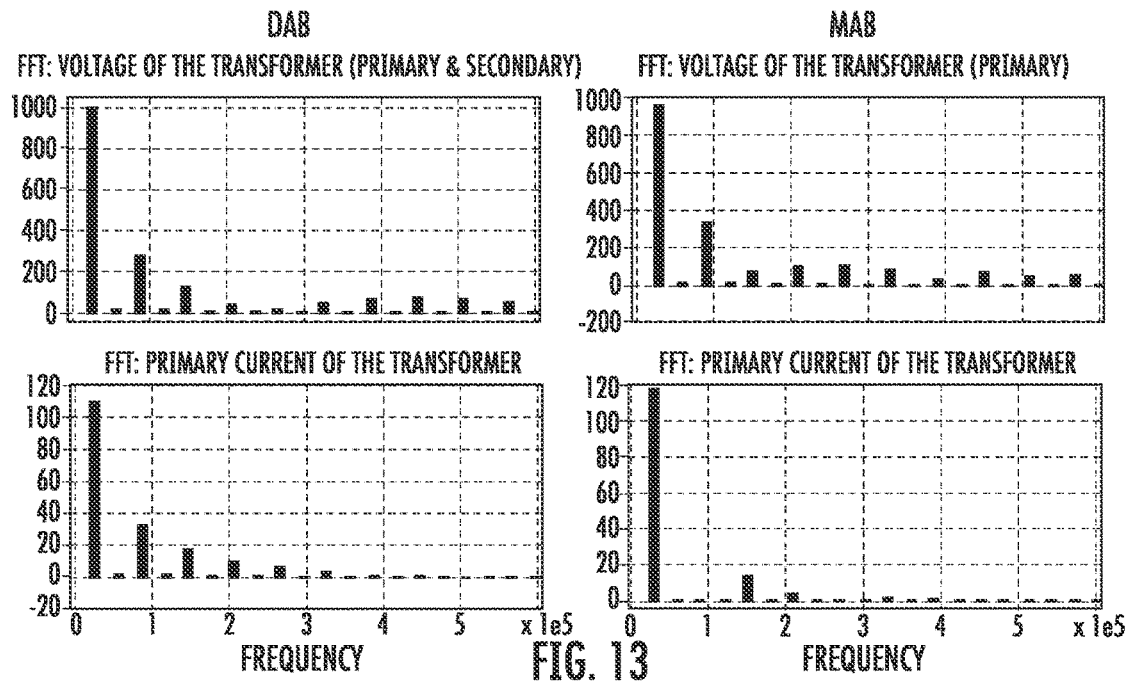
FIG. 13 shows a fast Fourier transform result of FIG. 12.

Fast Fourier transform (FFT) is performed on the current and voltage waveforms shown in FIG. 12 to obtain a current/voltage-frequency curve shown in FIG. 13. It is clear that, in the MAB-based converter of the present invention, $3^{rd}, 6^{th}, 9^{th} \ldots 3j^{th}$ (j is a positive integer) harmonics of the primary current of the transformer are significantly reduced, so that the loss of the transformer can be significantly reduced.

With the elimination of specific harmonics, the transformer of the present invention can operate at higher power and capacity, as well as higher efficiency and higher power density. In addition, this embodiment can reduce the voltage withstand capability of the semiconductor apparatuses, thereby reducing the cost.

Third Embodiment

Figure 14:
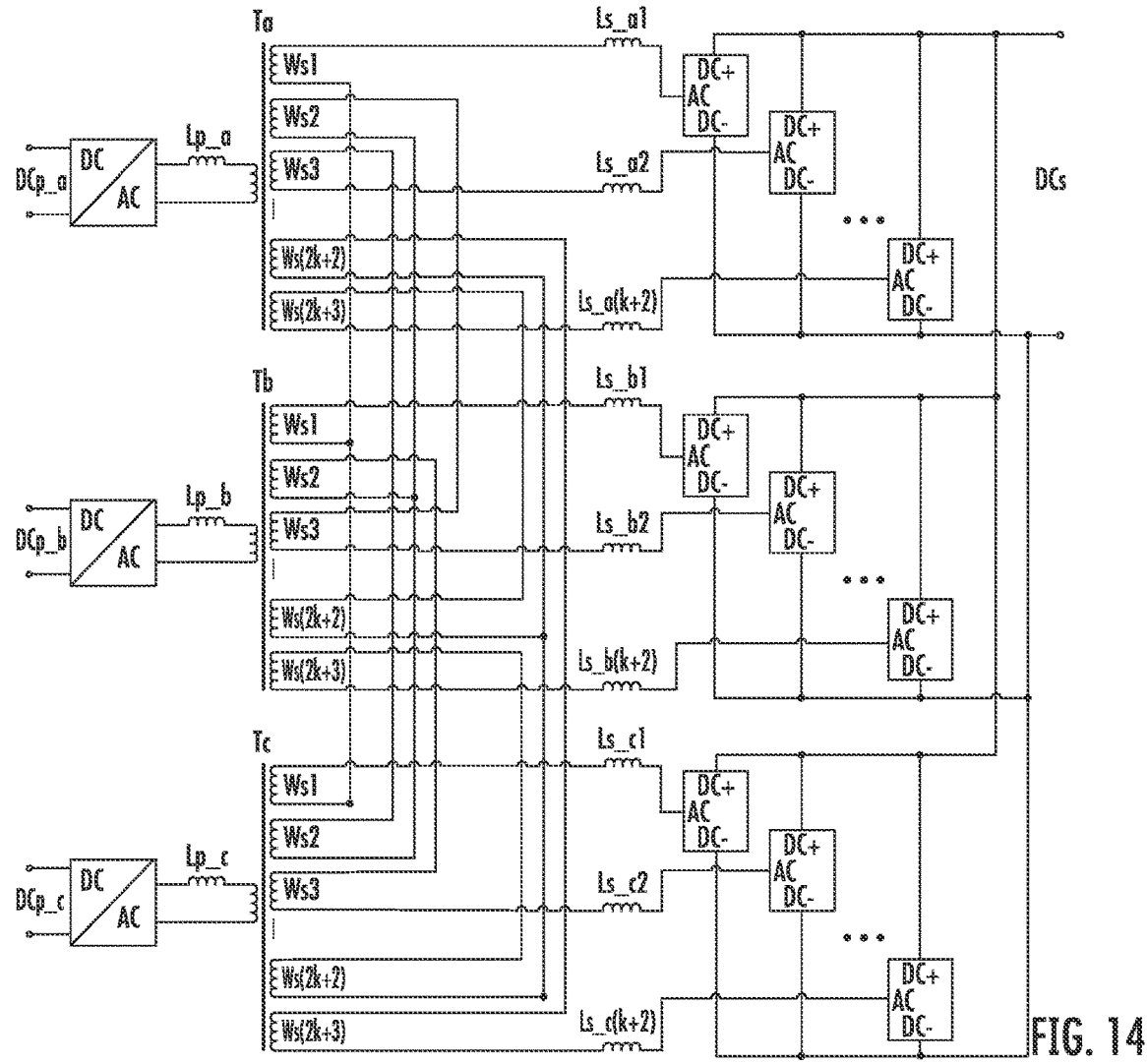
FIG. 14 is a circuit topology of a DC/DC converter section of a power conversion device according to a third embodiment of the present invention.

In the previous two embodiments, the solution of eliminating the $3^{rd}$ harmonics cannot suppress or eliminate the influences of $5^{th}, 7^{th}$ and other higher harmonics. In order to further solve this problem, the inventors propose a third embodiment. This third embodiment provides yet another power conversion device including a rectifier section and a DC/DC converter section. The rectifier section includes three cascaded (serially connected) rectifiers (AC/DC converters) (not shown). A circuit topology of the DC/DC converter section is shown in FIG. 14, in which three single-phase 2(k+2)-winding transformers (a single-phase transformer including one primary winding and (2k+3) secondary windings, where k=0, 1, 2, 3 ... ) Ta, Tb, and Tc are used to isolate the corresponding DC/AC bridges from (k+2) AC/DC bridges, respectively. DC input terminals DCp_a, DCp_b and DCp_c of the DC/AC bridge are respectively connected to output terminals of the corresponding rectifiers, and three rectifiers are connected in series with each other and then to mains power. An AC output terminal of any one of the DC/AC bridges is connected to a primary winding of a corresponding transformer. The first terminals of the first secondary windings Ws1 of the transformers Ta, Tb and Tc are connected to each other, and the second terminals of the first secondary windings Ws1 are connected to the AC input terminals of the corresponding AC/DC bridges; and the first terminals of the second secondary windings Ws2 are connected to each other, the second terminals of the second secondary windings Ws2 are connected to the first terminals of the third secondary windings Ws3 of the adjacent transformers, and the second terminals of the third secondary windings Ws3 are connected to the AC input terminals of the corresponding AC/DC bridges. By analogy, the first terminals of the secondary windings Ws(2k+2) of the transformers Ta, Tb and Tc are connected to each other, and the second terminals of the secondary windings Ws(2k+2) are connected to the first terminals of the secondary windings Ws(2k+3) of the adjacent transformers. The second terminals of the secondary windings Ws(2k+3) of the transformers Ta, Tb and Tc are connected to the AC input terminals of the corresponding (k+2)$^{th}$ AC/DC bridges. Positive busbars DC+ and negative busbars DC− of the DC output terminals of a total of 3*(k+2) AC/DC bridges corresponding to the transformers Ta, Tb and Tc are respectively connected to each other, thereby forming DC output Dcs. In this embodiment, the AC/DC bridges are three-terminal bridges each comprising one AC terminal and two DC terminals. In addition, as shown in FIG. 14, inductances Lp_a, Lp_b and Lp_c between the AC output terminals of the DC/AC bridges and the primary sides of the transformers and inductance Ls_a1 to Ls_a(k+2), Ls_b1 to Ls_b(k+2) and Ls_c1 to Ls_c(k+2) between respective windings on the secondary sides of the transformers and the AC input terminals of an AC/DC bridges may be separate inductances, or may represent leakage inductances of the corresponding transformers. Similarly, one unit of the DC/DC converter section is referred to as a multi-active bridge (MAB). Those skilled in the art can understand that the MAB in this embodiment is additionally added with (2k+2) secondary windings and (k+1) AC/DC bridges on the basis of the MAB including the single-phase two-winding transformer in the first embodiment, and the added secondary windings constitute a Zig-Zag connection.

Figure 15:
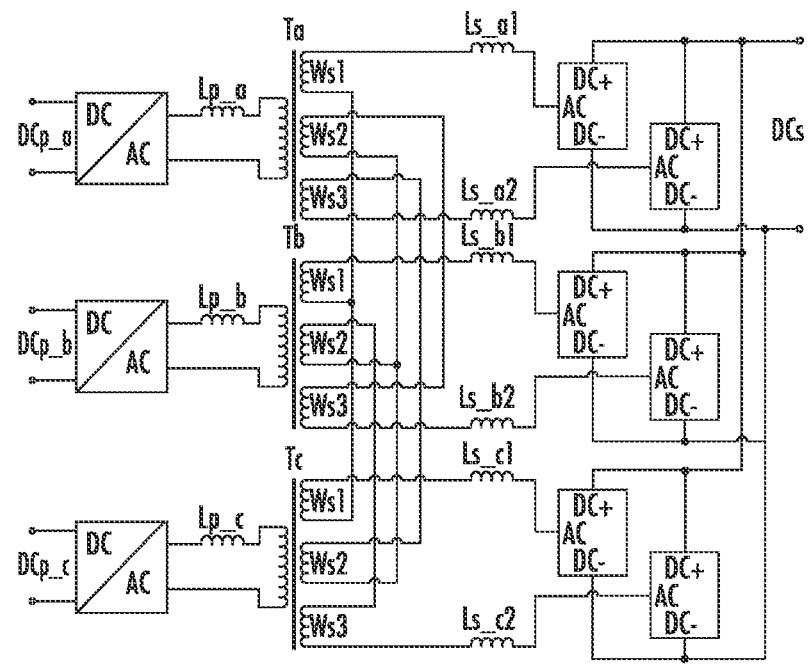
FIGS. 15 and 16 are examples of the circuit topology of the DC/DC converter section according to the third embodiment of the present invention.
Figure 16:
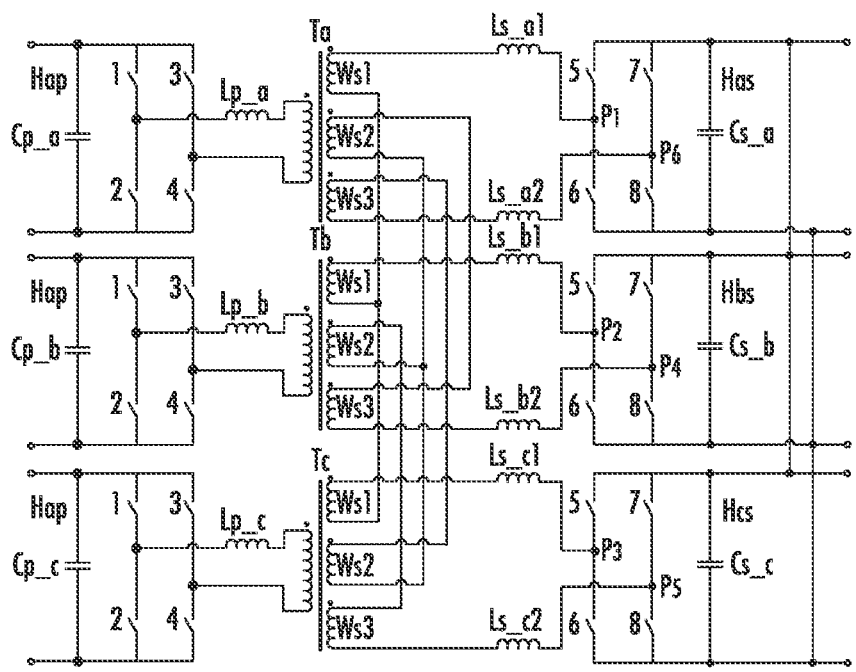

Referring to the example of the DC/DC converter section of this embodiment shown in FIG. 15, taking k=0, each of the transformers Ta, Tb and Tc includes only three secondary windings Ws1, Ws2 and Ws3. FIG. 16 shows a circuit topology of the DC/DC converter section when the DC/AC bridges and the AC/DC bridges in FIG. 15 respectively adopt the topologies shown in FIG. 3b and FIG. 4. Two three-terminal AC/DC bridges connected to the secondary windings of each transformer share the same capacitor Cs_a, Cs_b or Cs_c with switches 5-8 thereof constituting H bridges Has, Hbs or Hcs. The H bridges in the DC/AC bridges are marked with Hap, Hbp, and Hcp, and the capacitors thereof are marked with Cp_a, Cp_b, and Cp_c.

The essence of the third embodiment is to use a zigzag (Zig-Zag) winding method on the secondary sides of the transformers to change the phases of specific-order harmonics without changing the phases of the fundamental waves, so that the harmonics in the transformers are suppressed.

Figure 17:
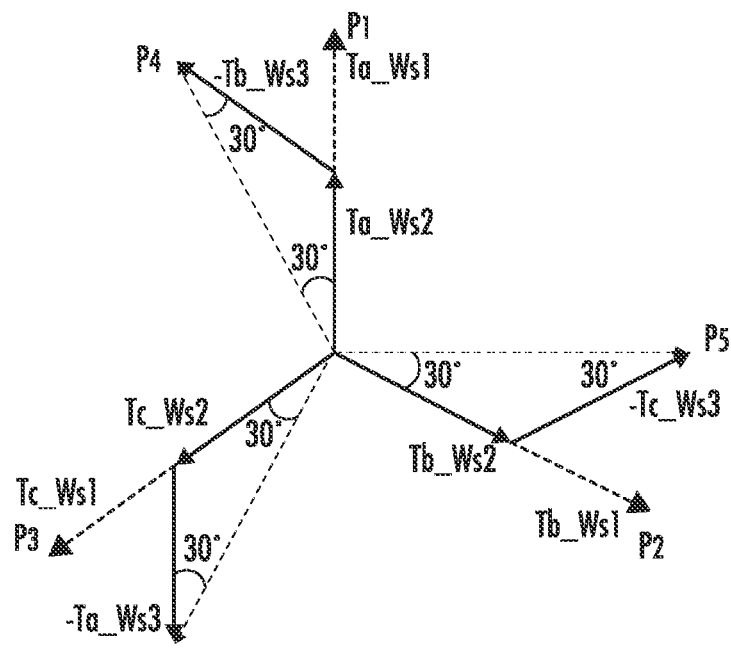
FIG. 17 shows a phase relationship of AC voltages of three-terminal AC/DC bridges in the circuit topology in FIG. 16.

Taking the circuit topology shown in FIG. 16 as an example, FIG. 17 shows a phase relationship of the AC voltages (input voltages, that is, secondary side voltages of the transformers) of the three-terminal AC/DC bridges. P$_1$ to P$_6$ respectively represent AC voltage vectors of the first AC/DC bridges connected to the transformers Ta, Tb and Tc and AC voltage vectors of the second AC/DC bridges connected to the transformers Ta, Tb and Tc. Ta_Ws1, Ta_Ws2, Ta_Ws3, Tb_Ws1, Tb_Ws2, Tb_Ws3, Tc_Ws1, Tc_Ws2 and Tc_Ws3 respectively represent output voltage vectors of the three secondary windings Ws1, Ws2, and Ws3 of Ta, Tb, and Tc. With reference to FIG. 16, it can be seen that the AC voltage of the first AC/DC bridge corresponding to each transformer is an output voltage of its first secondary winding Ws1, and a AC voltage of the corresponding second AC/DC bridge is an output voltage of a composite winding of its third secondary winding Ws3 and the second secondary winding Ws2 of the adjacent transformer.

When phases of fundamental waves of the AC voltage of P1, P2, P3, P4, P5, and P6 are controlled as shown in FIG. 17, that is, when P4 and P1, P6 and P3, as well as P5 and P2 respectively differ by 30 degrees in electrical angle, as for 5$^{th}$ and 7$^{th}$ Harmonics, harmonic magnetomotive potential of the Ws1 winding differ from that of the composite winding (Zig-Zag) of Ws3 and Ws2 of the adjacent transformer by 180 degrees in electrical angle. Therefore, for a transformer core, the 5$^{th}$ and 7$^{th}$ harmonic magnetomotive potentials generated by the Ws1 winding and 5$^{th}$ and 7$^{th}$ harmonic magnetomotive potentials generated by the composite winding of Ws2 and Ws3 cancel each other out, and the 5$^{th}$ and 7$^{th}$ current harmonics from the secondary side cannot be conducted to the primary side of the transformer. In this way, the 5$^{th}$ and 7$^{th}$ current harmonics on the primary side of the transformer can be largely suppressed.

Specifically, since a potential phase of each secondary winding must be consistent with that of the primary winding, the phases between the potentials of the secondary windings of each transformer must be the same. A magnitude-phase relationship between the potentials of the secondary windings of the transformer in the topology shown in FIG. 16 can be characterized in a vector form in FIG. 17. As can be seen from FIG. 17, a phase relationship of the AC terminal voltages of the AC/DC bridges corresponding to the secondary sides of the transformers is that P1 and P4 differ by 30 degrees in electrical angle, P2 and P5 differ by 30 degrees in electrical angle, and P3 and P6 differ by 30 degrees in electrical angle.

How the 5$^{th}$ and 7$^{th}$ harmonics on the primary sides of the transformers are suppressed under this control is analyzed as follows.

Figure 18:
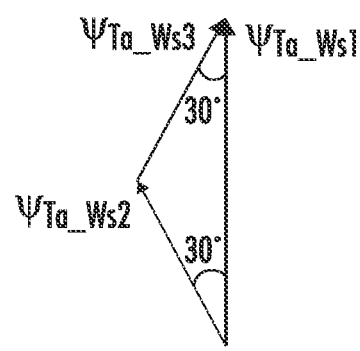
FIG. 18 takes a transformer Ta as an example to characterize a fundamental wave magnetic potential of the transformer under the excitation of the voltage on the secondary side shown in FIG. 17.

FIG. 18 takes a transformer Ta as an example to characterize fundamental wave magnetic potentials $\Psi_{Ta\_Ws1}$, $\Psi_{Ta\_Ws2}$ and $\Psi_{Ta\_Ws3}$ of the transformer under the excitation of the voltage on the secondary side shown in FIG. 17, wherein, according to a vector diagram, a turns-ratio of the windings Ta_Ws1, Ta_Ws2 and Ta_Ws3 should be:

$$Ta\_Ws2 = Ta\_Ws3 = \frac{Ta\_Ws1}{2\cos 30°}$$

In this example, according to the above formula, it can be concluded that the turns-ratio of windings Ws1, Ws2 and Ws3 is 100:58:58, and when this turns-ratio is selected, the 5$^{th}$ and 7$^{th}$ harmonics are suppressed.

Figure 19A:
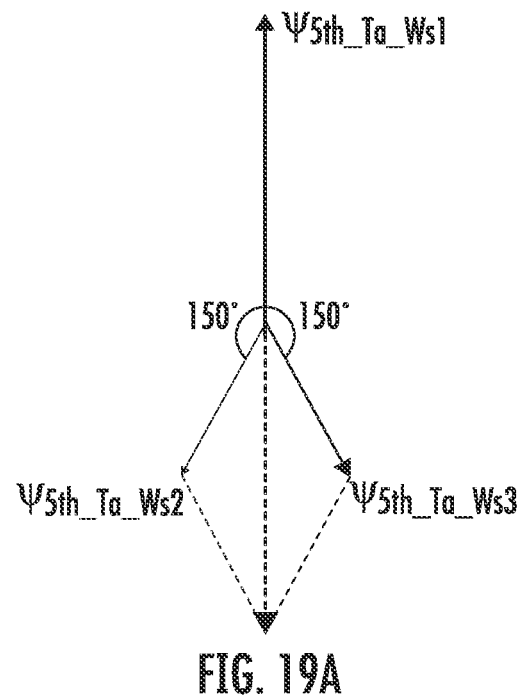
FIGS. 19a and 19b respectively characterize a phase relationship between the magnetic potentials of respective windings on the secondary side of the transformer for $5^{th}$ and $7^{th}$ harmonics.
Figure 19B:
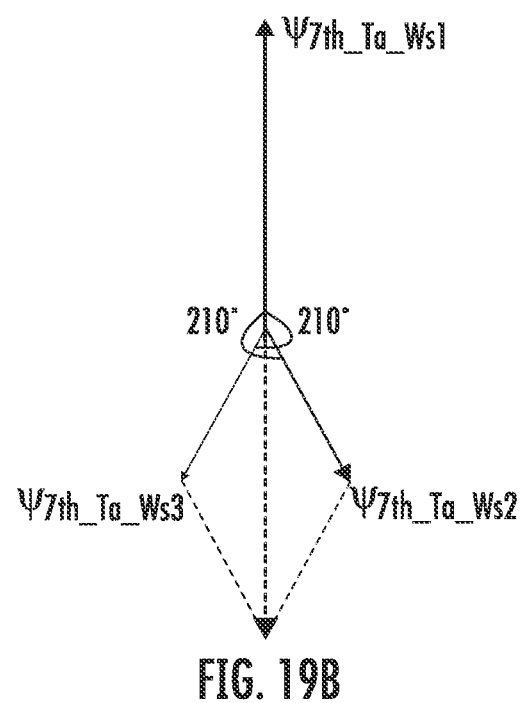

Therefore, for a fundamental wave, a composite magnetic potential of the windings Ws2 and Ws3 is exactly the same as a magnetic potential of the winding Ws1, indicating that the fundamental power transmitted by Ws2 and Ws3 is equal to that of Ws1. However, the phase shifts for Ws2 and Ws3 relative to Ws1 are respectively +30 degrees and −30 degrees, which, for the 5$^{th}$ harmonic, are equivalent to ±30×5=±150 degrees, and for the 7$^{th}$ harmonic, are equivalent to ±30×7=±210 degrees. FIGS. 19a and 19b respectively characterize a phase relationship of the magnetic potentials $\Psi_{5th\_Ta\_Ws1}$, $\Psi_{5th\_Ta\_Ws2}$ and $\Psi_{5th\_Ta\_Ws3}$ and a phase relationship of the magnetic potentials $\Psi_{7th\_Ta\_Ws1}$, $\Psi_{7th\_Ta\_Ws2}$ and $\Psi_{7th\_Ta\_Ws3}$ between the secondary windings of the transformer for the 5$^{th}$ and 7$^{th}$ harmonics. It can be seen that for the 5$^{th}$ and 7$^{th}$ harmonics, the composite magnetic potential of windings Ws2 and Ws3 and the magnetic potential of the winding Ws1 are equal in amplitude and opposite in phase, and cancel each other out in the entire transformer core, and thus, the 5$^{th}$ and 7$^{th}$ harmonic currents will not be induced in the primary side of the transformer.

Figure 20:
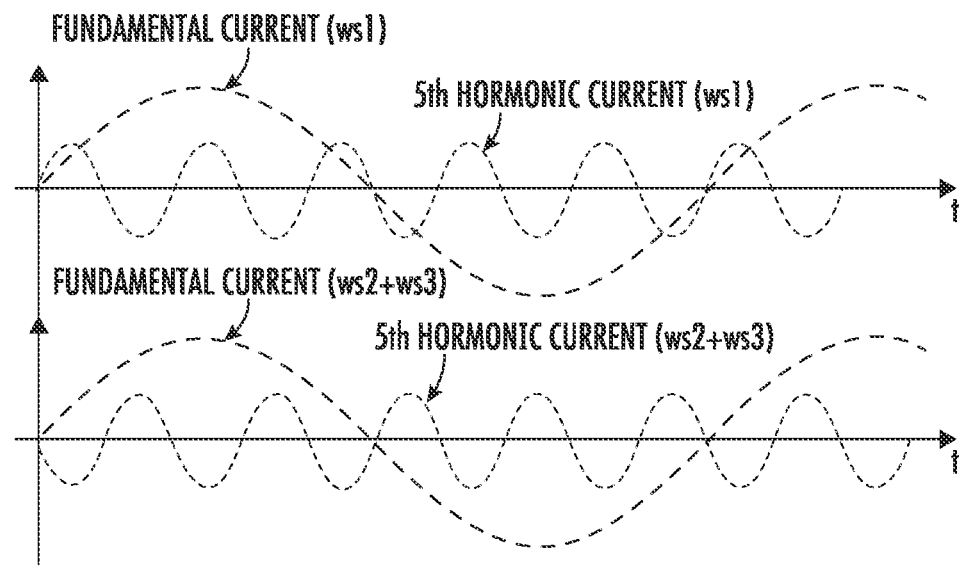
FIG. 20 shows current waveforms on the secondary side of the transformer including $5^{th}$ harmonics according to the third embodiment of the present invention.

Referring to current waveforms on the secondary side of the transformer including the 5$^{th}$ harmonics in this embodiment shown in FIG. 20, for the sake of convenience, only cases about the nodes p1 and p4 are shown. Those skilled in the art can understand that other nodes also have similar current waveform. When the phase of the output voltage of the secondary winding Ws1 of the transformer and the phase of the output voltage of the composite (Zig-Zag) winding of Ws2 and Ws3 differ by 30 degrees in electrical phase of the fundamental wave, for the $5^{th}$ harmonic, the harmonic magnetomotive potential between the Ws1 winding and the harmonic magnetomotive potential of the Ws2 and Ws3 composite winding differ by 150 degrees in electrical angle. Therefore, for the primary side of the transformer, the harmonic magnetomotive potential of the Ws1 winding and the harmonic magnetomotive potential of the Ws2 and Ws3 composite winding almost cancel each other out, and only a very small amount of the $5^{th}$ harmonics will be conducted to the primary side.

Figure 21:
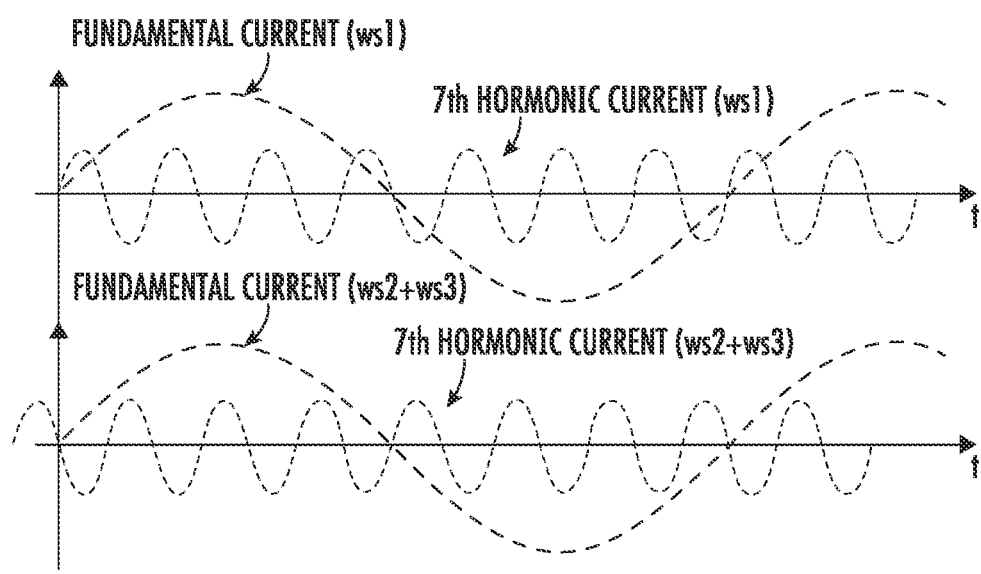
FIG. 21 shows current waveforms on the secondary side of the transformer including $7^{th}$ harmonics according to the third embodiment of the present invention.

Referring to current waveforms on the secondary side of the transformer including the $7^{th}$ harmonics in this embodiment shown in FIG. 21, for the sake of convenience, only cases about the nodes p1 and p4 are shown. Similarly, for the $7^{th}$ harmonic, the harmonic magnetomotive potential of the Ws1 winding and the harmonic magnetomotive potential of the Ws2 and Ws3 composite winding differs by 210 degrees in electrical angle. Therefore, for the primary side of the transformer, the harmonic magnetomotive potential of the Ws1 winding and the harmonic magnetomotive potential of the Ws2 and Ws3 composite windings almost cancel each other out, and only a very small amount of the $7^{th}$ harmonics will be conducted to the primary side.

Similarly, the inventors simulate the voltages and currents of a DAB-based (n=3) converter in the prior art and an MAB-based converter in the present invention shown in FIG. 16 respectively working at a switching frequency of 30 kHz based on a power electronic system simulation platform PLECS®. Referring to simulation results shown in FIG. 22, a phase shift between bridges of adjacent branches is 120°. The left side shows current and voltage waveforms of the DAB-based converter in the prior art, and the right side shows current and voltage waveforms of the MAB-based converter of the present invention. It is clear that a waveform of the primary current of the transformer of the present invention is more regular.

Figure 22:
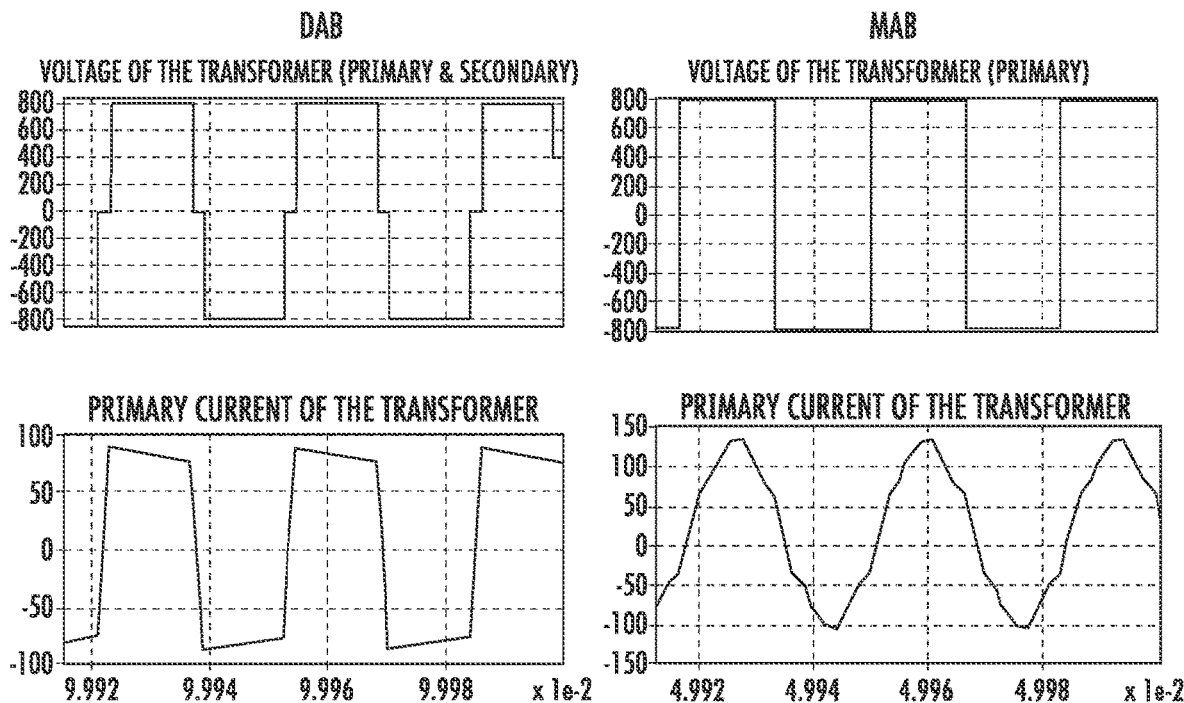
FIG. 22 shows simulation results of transformer voltage and current in the circuit topology shown in FIG. 16.
Figure 23:
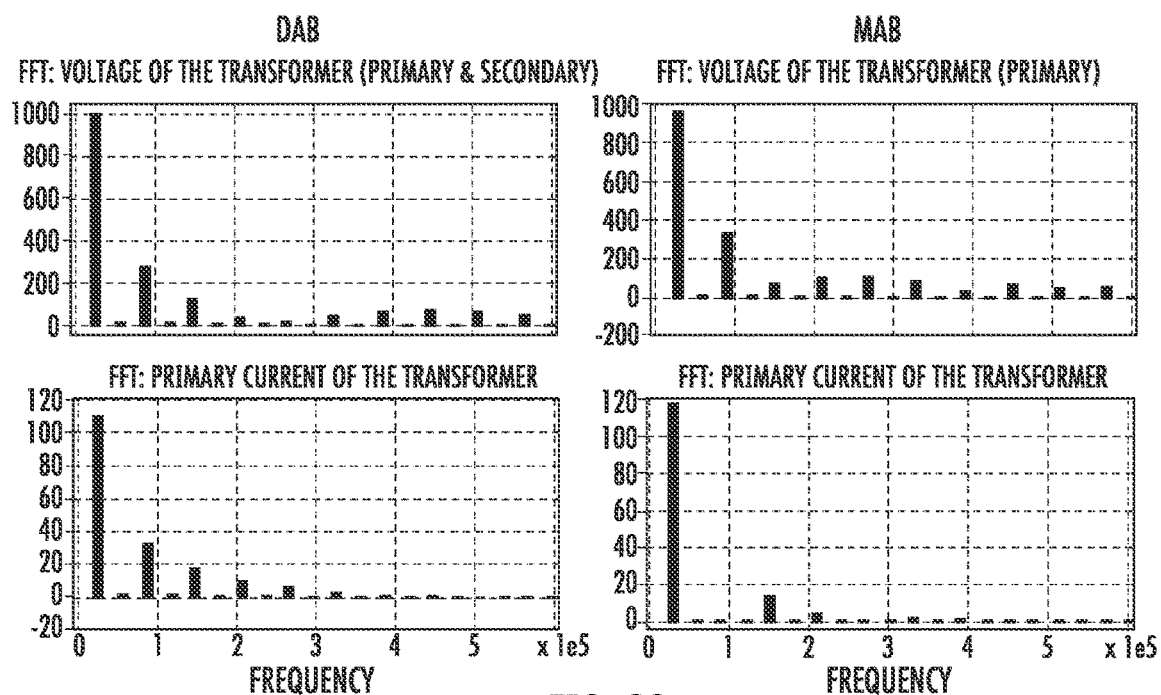
FIG. 23 shows a fast Fourier transform result of FIG. 22.

Fast Fourier transform (FFT) is performed on the current and voltage waveforms shown in FIG. 22 to obtain a current/voltage-frequency curve shown in FIG. 23. It can be seen that in the MAB-based converter of the third embodiment, the $3^{rd}$, $6^{th}$, $9^{th}$ . . . $3j^{th}$ (j is a positive integer) harmonics of the transformer current are eliminated, while the $5^{th}$ and $7^{th}$ harmonics are significantly suppressed. In this way, the loss of the transformer can be significantly reduced.

With the elimination of specific harmonics, the transformer of the present invention can operate at higher power and capacity, as well as higher efficiency and higher power density.

Although the present invention has been described in terms of the preferred embodiments, the present invention is not limited to the embodiments described herein, and various variations and changes can be made without departing from the scope of the present invention.

The invention claimed is:

1. A multi-active bridge converter comprising n multi-active bridges, wherein each of the n multi-active bridges comprises a DC/AC bridge, a single-phase transformer and m AC/DC bridges, where n is greater than or equal to 3, and m is greater than or equal to 1;
the single-phase transformer is provided with one primary winding and m secondary windings; the DC/AC bridge is configured to receive a DC input signal, and AC output terminals of the DC/AC bridge are connected to the primary winding of the single-phase transformer; one terminal of the $i^{th}$ secondary winding among the m secondary windings of the single-phase transformer is connected to an AC input terminal of the $i^{th}$ AC/DC bridge among the m AC/DC bridges, the other terminal of the $i^{th}$ secondary winding is connected to the other terminals of the $i^{th}$ secondary windings among m secondary windings of single-phase transformers in the remaining (n−1) multi-active bridges, where i is greater than or equal to 1 and less than or equal to m; and
positive busbars DC+ and negative busbars DC− of the DC output terminals of all the AC/DC bridges among the n multi-active bridges are respectively connected with each other to serve as DC output terminals of the multi-active bridge converter,
wherein the AC/DC bridge is a three-terminal bridge.

2. The multi-active bridge converter of claim 1, wherein the DC/AC bridge comprises a first capacitor and a second capacitor connected in series with each other, and a first switch and a second switch connected in series with each other, wherein a series circuit composed of the first capacitor and the second capacitor is connected in parallel to a series circuit composed of the first switch and the second switch so as to form a parallel circuit, both ends of the parallel circuit serve as DC input terminals of the DC/AC bridge, and a node between the first capacitor and the second capacitor and a node between the first switch and the second switch serve as the AC output terminals of the DC/AC bridge.

3. The multi-active bridge converter of claim 1, wherein the DC/AC bridge includes an H bridge composed of first to fourth switches and a capacitor connected in parallel to input terminals of the H bridge, both terminals of the capacitor serve as DC input terminals of the DC/AC bridge, and a node between the first switch and the second switch and a node between the third switch and the fourth switch serve as the AC output terminals of the DC/AC bridge.

4. The multi-active bridge converter of claim 1, wherein the three-terminal bridge includes a first switch and a second switch connected in series with each other, and a capacitor connected in parallel with a series circuit composed of the first switch and the second switch, wherein a node between the first switch and the second switch serves as an AC input terminal of the three-terminal bridge, and both terminals of the capacitor serve as DC output terminals of the three-terminal bridge.

5. The multi-active bridge converter of claim 1, wherein the AC output terminals of the DC/AC bridge are connected to the primary winding of the single-phase transformer through a first inductor, and one terminal of the $i^{th}$ secondary winding among the m secondary windings of the single-phase transformer is connected to the AC input terminal of the $i^{th}$ AC/DC bridge among the m AC/DC bridges through a second inductor.

6. The multi-active bridge converter of claim 1, wherein n is equal to 3, and m is equal to 2.

7. The multi-active bridge converter of claim 1, wherein m is equal to 1.

8. The multi-active bridge converter of claim 7, wherein the single-phase transformer further comprises 2k+2 secondary windings and k+1 AC/DC bridges, where k≥0, wherein first terminals of the $(2k+1)^{th}$ secondary windings among the 2k+2 secondary windings of single-phase transformers of the n multi-active bridges are connected to each other, second terminals of the $(2k+1)^{th}$ secondary windings are connected to first terminals of the $(2k+2)^{th}$ secondary windings among the 2k+2 secondary windings of the single-phase transformers of the adjacent multi-active bridges, and second terminals of the $(2k+2)^{th}$ secondary windings are connected to AC input terminals of corresponding $(k+1)^{th}$ AC/DC bridges.

9. The multi-active bridge converter of claim 8, wherein n is equal to 3.

10. The multi-active bridge converter of claim 9, wherein k is equal to 0.

11. The multi-active bridge converter of claim 10, wherein a turns-ratio of the first secondary winding to the second secondary winding to the third secondary winding of the single-phase transformer is 100:58:58.

12. A power conversion device, comprising a rectifier section and the multi-active bridge converter of claim 1, wherein the rectifier section comprises n cascaded rectifiers, and input terminals of any one of the n multi-active bridges of the multi-active bridge converter are connected to output terminals of a corresponding one of the n cascaded rectifiers.

13. A control method for the multi-active bridge converter of claim 1, wherein phase angles at which waveforms of output voltages of the single-phase transformers in the n multi-active bridges are staggered with each other are controlled to be equal to a period of one $n*j^{th}$ harmonic, where j is a positive integer.

* * * * *